W. W. BIRNSTOCK.
NON-RECOUNT FABRIC MEASURING ROLL.
APPLICATION FILED OCT. 23, 1907.
913,676.
Patented Feb. 23, 1909.
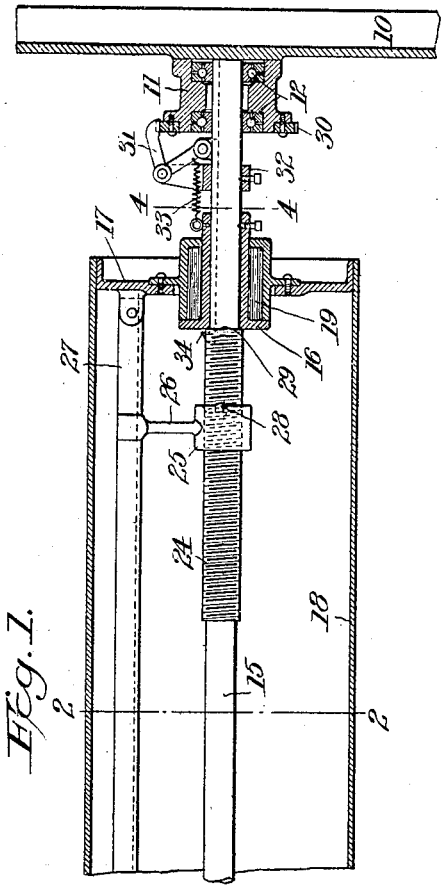
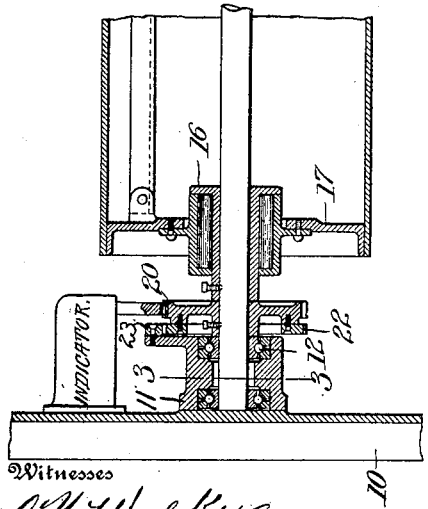
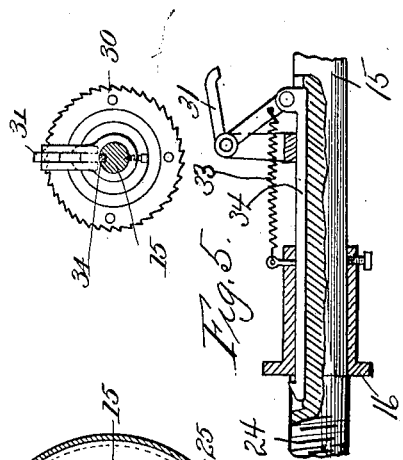
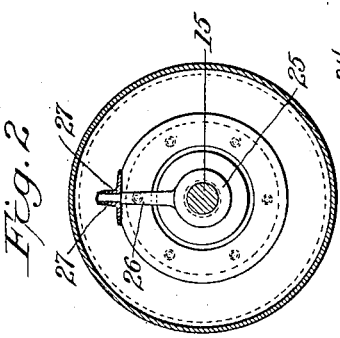
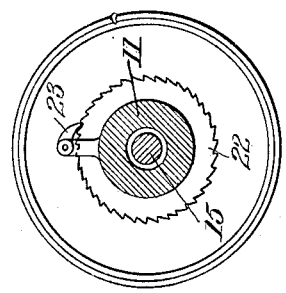
Witnesses
Inventor
W. W. Birnstock
By
Sturtevant & Mason
Attorneys

UNITED STATES PATENT OFFICE.

WILLIAM W. BIRNSTOCK, OF YORK, PENNSYLVANIA.

NON-RECOUNT FABRIC-MEASURING ROLL.

No. 913,676.  Specification of Letters Patent.  Patented Feb. 23, 1909.

Application filed October 23, 1907. Serial No. 398,775.

*To all whom it may concern:*

Be it known that I, WILLIAM W. BIRNSTOCK, a citizen of the United States, residing at York, in the county of York, State of Pennsylvania, have invented certain new and useful Improvements in Non-Recount Fabric-Measuring Rolls, of which the following is a description, reference being had to the accompanying drawing, and to the figures of reference marked thereon.

This invention relates to apparatus of that class employed for the measuring of silks or other fabrics, or long strips of ribbon or other materials.

The principal object of the invention is to provide a measuring drum of such diameter as to constitute a unit of measuring, the drum being preferably one yard in circumference, and being so connected to an indicating or registering mechanism that during the forward or measuring movement the indicating mechanism will be actuated, but on reverse movement will remain idle and will not be again started into operation until the fabric has resumed the exact position at which the movement of the indicator ceased.

A further object of the invention is to provide a measuring drum which may be readily reversed for the purpose of permitting examination of a portion of the fabric that has been measured, without turning back the registering or indicating mechanism, and without starting such registering or indicating mechanism into operation until the exact length of cloth moved backward has been again fed forward over the drum.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of structure may be made without departing from the spirit or sacrificing any of the advantages of the invention.

In the accompanying drawings:—Figure 1 is a longitudinal sectional elevation of a measuring drum constructed in accordance with the invention. Fig. 2 is a transverse sectional view of the same on the line 2—2 of Fig. 1. Fig. 3 is a transverse sectional view, showing one of the ratchet wheels and pawls, on the line 3—3 of Fig. 1. Fig. 4 is a similar view, on the line 4—4 of Fig. 1. Fig. 5 is a sectional view of a portion of the shaft showing the nut actuated rod.

Similar numerals of reference are employed to indicate corresponding parts throughout the several figures of the drawings.

The measuring apparatus is supported by a frame 10, from the opposite sides of which extend brackets or supports 11 carrying roller or ball bearings 12 for the support of the drum shaft 15. To this shaft are secured bushings 16, on which are mounted the heads 17 of the securing drum 18, suitable roller bearings 19 being interposed between the bushings and the drum heads in order to permit free rotation of the drum independent of the shaft. The drum proper is formed of metal, fiber, or any other material that will retain its form without excessive expansion or contraction, and the circumference of the drum is preferably one yard, or other unit of measurement.

Secured to one end of the shaft is the primary wheel of a registering or indicating device that may be of any ordinary construction, and, therefore, has not been illustrated in detail. Under ordinary conditions of use, the measuring drum is rotated as the cloth passes over, and the shaft rotates with the drum and imparts movement to the registering or indicating device through the gear wheel 20. When the drum is to be reversed for the purpose of moving the cloth backward to permit inspection of a portion of the fabric that has already been measured, the shaft is held stationary while the drum revolves independently thereof, and provision is made for preventing the registering movement of the shaft until the drum has moved forward the exact distance which it previously moved in the opposite direction, so that the indicating or registering operation proceeds from the exact point at which it previously stopped.

In order to prevent rearward movement of the shaft when the drum moves backward, the shaft is provided with a ratchet wheel 22, with which engages a pawl 23 that is pivoted to one of the bearings 11, the pawl clicking over the ratchet wheel during the measuring operation and instantly arresting any reverse movement of the shaft.

A portion of the shaft adjacent one end of the drum is provided with screw threads 24 for the reception of a nut 25, from which projects an arm 26 that is arranged to slide between a pair of parallel guide bars 27 that are rigidly secured to the heads of the drum. That face of the nut adjacent the head of the drum is provided with a projecting lug 28 that is arranged to engage a corresponding lug 29 on one of the bushings 16 when the nut is at the extreme end of its movement in one direction, and under normal conditions when the drum is registering the lug 28 will be engaged with the lug 29, and the drum will, therefore, be locked to and rotate with the shaft. If, however, the drum is moved in the opposite direction to turn back a portion of the cloth that has already been measured, the drum will turn independent of the shaft, the latter being locked by the pawl 23, and the nut 25 will be carried around the threaded portion of the shaft and will be turned away from the lug 29, so that the drum will be free to rotate, while the shaft is held stationary, and the length of the screw is such that the drum may make any desired number of rotations, the screw, if necessary, being extended the full length of the drum.

Secured to one of the stationary bearings, is a ratchet wheel 30, the teeth of which face in a direction opposite to that of the teeth of the ratchet wheel 20, and with this ratchet wheel a pawl 31 is adapted to engage. This pawl is pivotally mounted on a collar 32 that is rigid with the shaft and is moved in one direction by a spring 33 that tends at all times to move the pawl into engagement with the ratchet wheel. The pawl is moved in the opposite direction through a rod 34, that is mounted in a groove in the shaft 15, the inner end of the rod being tapered and arranged to be engaged by the wall of a recess formed in that face of the nut adjacent the head of the drum, so that when the nut is screwed along the shaft into position to engage the lugs 28 and 29, the end of the nut will engage the rod 34, and will move the pawl to release position. When the drum is moving forward, in measuring, the drum and shaft are locked together by the engagement of lugs 28 and 29 so that each rotation of the drum is imparted to the shaft and thence to the gear 20 and the indicator.

It will be observed that as soon as the drum starts to move rearward and the nut 25 moves away from the head of the drum, that the rod 34 is moved to the left and the spring 33 then moves the locking pawl into engagement with the ratchet wheel 30, so that the shaft is locked from forward movement by the ratchet wheel 30, and from rearward movement by the ratchet wheel 20, and cannot rotate in either direction until the drum has been turned forward to precisely the same extent to which it has previously been turned rearward, and when this occurs and the cloth which has been moved backward for reinspection has once more passed over the measuring drum, the lugs 28 and 29 are brought into engagement, and the recessed end of the nut engages the rod 34, thus moving the pawl 31 to release position and the drum and shaft are again locked together for forward rotative movement, the measuring and indicating operation proceeding from this point. It will thus be seen that I have provided a drum adapted to contact with a material for the purpose of measuring the same. Said drum is connected with an indicating or registering device and said connection includes devices whereby said indicating or registering device will be operated by said drum when moved in one direction, and disconnected therefrom when moved in the opposite direction. Said connecting means also includes devices whereby when the drum is again rotated the indicating mechanism will not be operated until the drum has moved in a forward direction a distance corresponding exactly to the distance of a previous reverse movement.

It is obvious that the mechanism may be employed for a variety of purposes, and that it is of especial value in the measuring of long bands or strips of fabric or other material.

Having thus particularly described my invention, what I claim as new and desire to secure by Letters Patent, is:—

1. In combination, movable means, mechanism for indicating the extent of movement of said movable means in one direction, means for disconnecting said movable means and the indicating mechanism on movement of said movable means in reverse direction, and for automatically connecting said movable means to the indicating mechanism after said movable means has moved in a forward direction a distance equal to the previous movement in the reverse direction.

2. In combination, a revoluble drum, means for indicating the number of revolutions of the drum in one direction, means for disconnecting the drum and indicating mechanism on movement of the drum in the opposite direction, and for automatically connecting the drum to the indicating mechanism after said drum has moved in a forward direction a distance corresponding exactly to the distance of a previous reverse movement.

3. In combination, a revoluble drum, means for indicating the number of revolutions of the drum in one direction, means for disconnecting the drum from the indicating mechanism on movement of the drum in reverse direction, and for preventing connection of the drum to the indicating mechanism until the drum has moved forward a distance corresponding to the extent of a previous reverse movement.

4. In combination, a drum, means for indicating the extent of movement of the drum in one direction, means for disconnecting the drum and indicating mechanism on movement of the drum in reverse direction, and for automatically connecting the drum to the indicating mechanism after the drum has traversed in a forward direction a distance equal to a previous movement in the reverse direction.

5. In combination, a revoluble measuring drum, a shaft on which said drum may rotate freely, means for indicating the number of rotations of the shaft in one direction, means for locking the shaft against rotative movement in the opposite direction, means for locking the drum to the shaft when the drum is moved forward, and for disconnecting the drum and shaft when the drum is moving rearward.

6. In combination, a shaft, means for indicating the number of rotations of the shaft in one direction, means for locking the shaft against reverse movement, a drum mounted on the shaft, means for locking the drum to the shaft when the drum is rotated forwardly, and for automatically disconnecting the drum from the shaft when the drum is moved in reverse direction.

7. In combination, a shaft, means for indicating the number of rotations of the shaft in one direction, a pawl and ratchet wheel serving to prevent rotative movement of the shaft in the opposite direction, a measuring drum mounted on the shaft, means for locking the drum and shaft as the drum moves in one direction, and for disconnecting the drum from the shaft on movement in the reverse direction, and means for preventing forward movement of the shaft until the shaft and drum are interlocked.

8. In combination, a shaft, a pair of pawl and ratchet mechanisms operating to prevent independent rotative movement of said shaft in either direction, a drum movable with the shaft in one direction and independent of the shaft in the other direction and automatic connecting means between the drum and shaft.

9. In combination, a shaft, means for preventing backward rotative movement of the same, a drum mounted upon and revoluble with the shaft in a forward direction, and means for preventing forward movement of the shaft when the latter is disconnected from the drum.

10. In combination, a shaft, means for indicating the number of rotations of the shaft, a pawl and ratchet for preventing reverse movement of the shaft, said shaft having a threaded periphery, a drum mounted on the shaft, a pair of spaced guides carried by the drum, a nut mounted on the threaded portion of the shaft and having an arm extending between said guides, interengaging lugs carried one by the nut and the other by the head of the drum, a fixed ratchet wheel, a pawl carried by the shaft, a spring engaging said pawl and tending to move the same into engagement with the ratchet wheel, a slidable rod mounted in a groove in the shaft and arranged to be engaged by the nut, and means for connecting said rod to said pawl.

In testimony whereof I affix my signature, in presence of two witnesses.

WILLIAM W. BIRNSTOCK.

Witnesses:
  Wm. H. Hoke,
  J. W. Dittenheffer.